Figure 1:
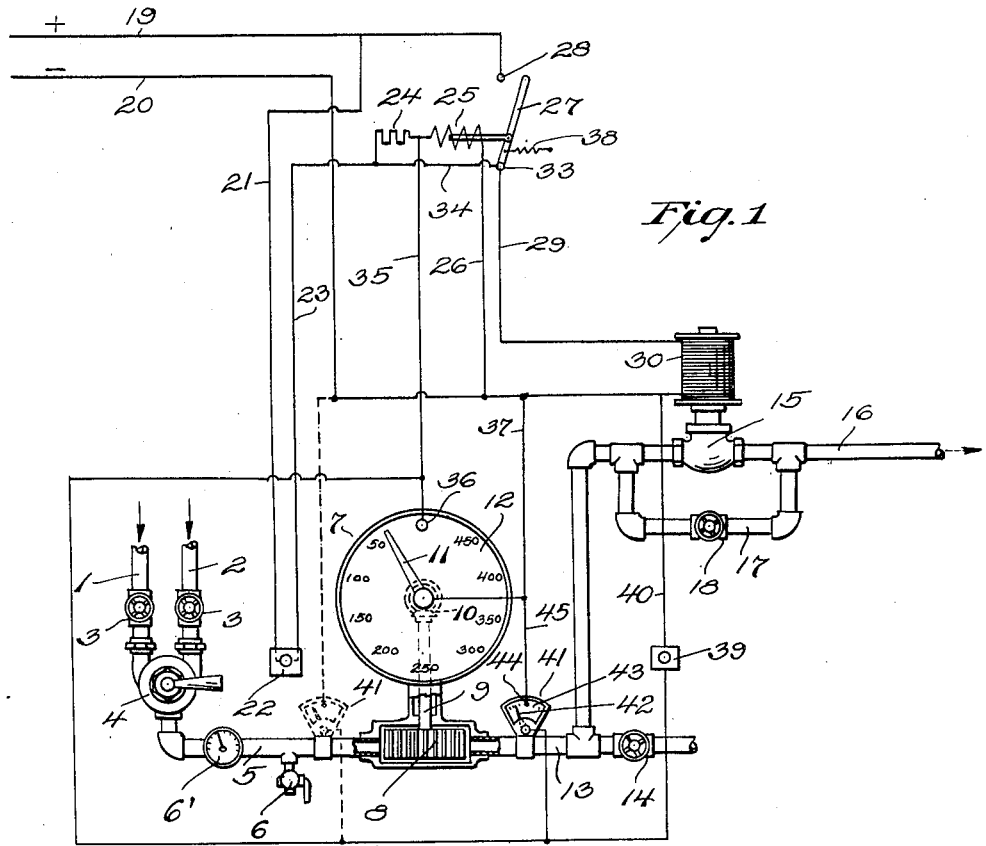

Sept. 9, 1930.  F. D. PFENING ET AL  1,775,293
LIQUID MEASURING AND DISPENSING APPARATUS
Filed May 24, 1929

Inventor
F. D. Pfening &
H. Pfening Jr.
By W. D. McDowell
Attorney

Patented Sept. 9, 1930

1,775,293

UNITED STATES PATENT OFFICE

FREDERIC D. PFENING AND HENRY PFENING, JR., OF COLUMBUS, OHIO

LIQUID MEASURING AND DISPENSING APPARATUS

Application filed May 24, 1929. Serial No. 365,698.

This invention has for an outstanding object the provision of novel and automatic mechanism for measuring and controlling the flow of a liquid or other mobile body through a determined channel, whereby provision is made for arresting automatically further flow of the liquid or mobile body through such channel when a measured or predetermined quantity has passed through.

The invention further comprises the provision of apparatus of this nature wherein means are provided for regulating the temperature of the liquids or semi-liquids under measurement and passing through the apparatus to the end of securing uniform temperatures and to arrest further passage of the materials under measurement in the event there takes place any substantial fluctuation in the desired uniform temperature.

It is another object of the invention to provide apparatus of this character wherein use is made of a recording meter operable by the passage of the fluid therethrough to indicate the weight or volume of the materials passing through the apparatus, and to associate with the recording index or dial of said meter electro-responsive means which are operable to control the actuation of valve mechanism for curtailing further flow of the materials under measurement when said dial or index reaches a predetermined position of measurement.

It is a further object of the invention to provide means for controlling the temperature of the liquids entering and passing through the recording meter and to provide means for recording the temperature of the liquids before or after the latter have passed through said meter, an electric circuit being associated with said temperature indicating means for controlling the operation of the automatic shut-off valve in the event there is any material fluctuation in the temperature of the fluid from a predetermined mean.

While the mechanism comprising the present invention is applicable to many fields requiring liquid measuring and dispensing apparatus, yet it is particularly adapted for use in baking establishments wherein operations are present, such, for example, as the making of bread or dough mixtures, wherein a carefully determined amount of water at a pre-determined temperature is a requisite to successful baking. Heretofore, bakers have employed large tanks holding a pre-determined quantity of water from which the latter has been led at roughly determined temperatures to the dough mix. The present invention provides a measuring unit of an automatic character which is intended to replace the unsatisfactory systems of water measurement heretofore employed by bakers. Thus the present invention provides a simple, compact unit adapted to be connected with the hot and cold water inlets of a bakery and wherein provision is made for mixing the water to attain a desired temperature, following which the water is passed through a recording meter, thence through a solenoid operated valve and is finally delivered to the point of use, there being connected with the dial of the recording meter a set valve and electric circuit which during the normal operation of the motor is closed in order to energize the windings of the solenoid valve and to permit of the passage of the water from the meter and through said valve, but wherein, after a pre-determined operation of the meter, the valve circuit is automatically de-energized or otherwise operated to effect the closure of said valve and to thereby arrest further flow of the liquid to the point of use.

It is a still further object of the invention to provide mechanism of this character which at all times is under the complete control and observation, with regard to its several functions, of an attendant and which may be manually started and stopped whenever desired, as well as automatically, and wherein provision is made for denoting during any given operation the exact quantity of liquid which is passed through and has been measured by the recording meter and also the temperature and other factors of operation. The apparatus comprises a small, compact unit requiring but slight space and which dispenses with the large bulky tanks heretofore employed in the measurement of bakery requirements. The unit may also be built into and form a part of the apparatus with which it is associated.

Figure 2:
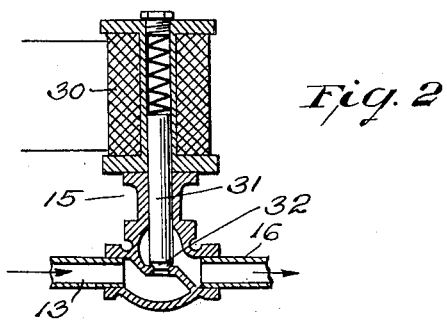

For a further understanding of the invention, reference is to be had to the following description and the accompanying drawing, in which:

Figure 1 is a diagrammatical view showing the several parts and circuits employed by the present invention, and Figure 2 is a vertical sectional view through the solenoid operated valve.

In the accompanying drawing, the numerals 1 and 2 represent pipes through which pass hot and cold water, usually under city main pressure. These pipes are provided with control valves 3 and discharge the liquids passing therethrough into a common mixing valve 4 in order that the water issuing from said valve 4 and flowing through the pipe line 5 may be maintained at a desired temperature. The line 5 is provided with a valve controlled test outlet 6 which, when the mechanism is initially operated, is opened to permit flowing of the water through the mixing valve and until a desired uniform temperature has been obtained. This may be further determined by inserting in the line 5 a temperature indicator 6'. When the desired temperature has been obtained, the pipe line 5 is closed permitting of the flow of water through the casing of a recording meter 7.

The meter 7 is of standard construction and may be of any desired type wherein provision is made for recording accurately the flow of water or other liquids therethrough for the purpose of measuring either the weight or volume of such mobile matter. In this instance, the meter includes a rotor 8 which drives a shaft 9 provided with gearing 10 adapted for the purpose of rotating an index hand 11 which rotates over a graduated dial 12. In this instance the dial is provided with numerals or other indicia indicating pounds, although other units of measurement can, of course, be substituted for those disclosed.

After passing through the meter the water flows into a pipe line 13 in which is located a manually operated drain valve 14 and arranged in the line 13 beyond the drain valve is a solenoid operated valve 15. The outlet side of the valve 15 is connected with a pipe line 16 which leads to any suitable point of utilization. If desired, the pipe lines 13 and 16 may be connected by a shunt line 17 in which is located a manually controlled valve 18. In the normal operation of the system the valve 18 is closed so that the water flowing through will be governed by the automatic valve 15. However, the shunt line is provided as an emergency apparatus whereby in the event of mechanical failure of the automatic valve the valve 18 may be opened and the system operated under manual regulation.

As above stated, it is a primary purpose of the present invention to automatically measure the quantity of water flowing through the meter 7 in order that the system will deliver a predetermined quantity of the liquid to the point of utilization and preventing or arresting further flow of the liquid after the said pre-determined quantity has been delivered. In attaining this object use is made of an electric circuit which includes an inlet and outlet line 19 and 20. The lead 19 is connected with a wire 21 which leads to a manually operated starting switch 22 which may be of the push button type. Leading from the switch 22 is a line 23 which extends to a resistance coil 24 and thence through the field 25 to a relay switch. From the field 25 a line 26 leads to the outlet lead 20. When the starting switch 22 is closed by a manual operation, the field 25 is excited, attracting the relay armature 27 and moving the latter into engagement with a stationary contact 28 with which the lead 19 is connected. From the armature 27 a line 29 extends to the field 30 of the solenoid valve 15, and the outlet side of the field 30 is connected with the lead 20. Thus the closing of the manual switch 22 results, first, in bringing the relay structure 27 to a circuit closing position and, second, in the energizing of the solenoid valve 30 which moves the core 31 carrying a valve head 32 to an open position, allowing for water flow through the solenoid valve and through the outlet line 16. Following the operation of the relay armature 27 the switch 22 may be released without affecting the operation of the solenoid valve. Connected with the pivotal point 33 of the armature 27 is a line 34 which is connected also with the line 23. Thus when the armature 27 is moved into engagement with the contact 28 by the operation of the switch 22 a shunt circuit is established permitting of the continued flow of current through the resistance coil 24 to the field 25 following release of the switch 22 for the purpose of maintaining the field 25 excited to hold the armature 27 in engagement with the contact 28 and thereby maintain the solenoid valve excited. Connected at a point on the line between the coil 24 and the field 25 is a line 35 which leads to a contact point 36, usually in registration with the zero position on the dial 12, and which point 36 is adapted to be engaged by the index hand 11 when the latter reaches a pre-determined position. The index hand is in turn connected with a line 37 which leads to the outlet 20.

Thus in operation, for example, if it is desired to measure 250 pounds of water the index hand 11 is set manually to register with the 250 pounds indication on the dial 12, after which the switch 22 is operated. This results, as previously stated, in the opening of the solenoid valve 15 and the passage of water through the meter. When the index hand 11 has been rotated until it reaches the zero position it contacts with the point 36 which results in short-circuiting the field 25, since the current passes directly through the line 35, the hand 11 to the ground side of the circuit. Due to the de-energizing of the field 25, the relay armature 27 returns, under the influence of its spring 38, to an open position which in turn breaks the circuit leading to the field of the solenoid valve. The de-energizing of the solenoid field 30 results in the closing of the solenoid valve and consequently arrests further water flow to the point of utilization.

In order to place the system under manual control also the line 35 leads to a push bottom switch 39, and a line 40 extends from the outlet side of the switch to the ground outlet 20. By manually pressing the switch 39 the field may be de-energized to close the solenoid valve. Thus the attendant may also stop water flow through the system by a quick and readily effective operation.

It is also desirable to provide for an automatic shut off of the liquids through the system when the temperature of the liquid exceeds a pre-determined point. This is effected by the provision of a temperature indicator 41, which has its base connected with the pipe line 13 so as to be responsive to the temperature of the liquids or other fluids passing through this portion of the system. The temperature indicator includes the movable arm 42 which passes over a graduated surface 43 indicating degrees of temperature on the Fahrenheit scale. The arm 42 has its pivotal point connected with the lead line 35 and is adapted to contact with a stationary point 44 which may be set arbitrarily at the upper limit of a given temperature range. The stationary point 44 is connected by a wire 45 to the ground outlet 20. Thus when the hand or arm 42 reaches a position indicating a temperature beyond which the temperature of the liquid under measurement should not exceed, the field 25 is de-energized to close the solenoid valve. The temperature indicator 41 may, of course, be placed in the line 5 if found desirable, as shown by dotted lines.

In view of the foregoing it will be seen that the present invention provides automatic apparatus for the purpose of regulating automatically the flow of a given quantity of a fluid body through a pipe line system, whereby to measure the volume of the fluid body in an accurate and effective manner. The system embodies means for maintaining the fluid within pre-determined temperature limits and, in addition, also provides means by which the system is at all times under manual control and regulation in addition to its automatic features. While it has been stated that the invention may be used in the measuring of water for use in the preparation of bakery mixes, nevertheless it will be understood that this is but a specific use of the invention and that the latter is adapted to many other fields of usefulness wherein automatic measuring and regulating of flowing bodies of a fluid are required.

What is claimed is:

1. In liquid measuring apparatus, a flow recording meter, an automatic valve arranged in the liquid outlet side of said meter, a temperature indicator responsive to the temperature of the liquids which pass through said meter, and electrically operated means including circuit making and closing devices carried by said meter and said temperature indicator for regulating the operation of said automatic valve.

2. In apparatus for measuring fluid flow, a recording meter operable by the passage of the fluid therethrough, means for delivering fluids under governable temperature to said meter, an automatically operating valve arranged in the fluid outlet side of said meter, means for indicating the temperature of the fluids passing through said meter, and electrically operated means including normally spaced contact devices carried by said meter and said temperature indicator for controlling the automatic operation of said valve.

3. In liquid measuring and dispensing apparatus, a meter operable in response to liquid flow therethrough, an automatic valve disposed in the liquid outlet side of said meter, a temperature indicator for denoting the temperature of the liquids passing through said meter, electrically operated means operable following pre-determined operation of said meter to close said automatic valve, and electro-responsive means operable when the liquids passing through said meter attain a pre-determined temperature to close said automatic valve.

4. In liquid measuring and dispensing apparatus, a meter, means for passing a liquid under pressure through said meter, a pipe line connected with the liquid outlet side of said meter, an automatic valve in said pipe line, means operable automatically following the passage of a pre-determined quantity of liquid through said meter to close said valve, and a manually operated drain in the pipe line between said meter and said automatic valve.

5. In liquid measuring and dispensing apparatus, a meter, means for supplying liquid under a governable temperature to said meter, a pipe line connected with the liquid outlet side of said meter, an automatic valve in said pipe line, means operable following the passage of pre-determined quantities of liquid through said meter to effect the automatic closing of said valve, and co-operative means responsive to effect the closing of said valve when the temperature of the liquids pass through said meter exceeds a desired peak temperature.

In testimony whereof we affix our signatures.

FREDERIC D. PFENING.
HENRY PFENING, Jr.